United States Patent Office 3,371,712
Patented Mar. 5, 1968

3,371,712
COMPOSITION AND METHOD OF AGGLOMERATING AND STABILIZING PARTICULATE MATTER BY CHEMICAL TREATMENT
Nicholas M. Adams, Chicago, Ill., assignor to Nalco Chemical Company, Chicago, Ill., a corporation of Delaware
No Drawing. Filed Apr. 19, 1966, Ser. No. 543,509
15 Claims. (Cl. 166—33)

This invention relates to a method of treating particulate matter by chemical means whereby cohesive masses are produced. More specifically, the invention is concerned with a method of treating sub-divided materials such as soils, sands and the like with certain novel polymerizable mixtures, such that, when polymerization of the mixture occurs in the presence of such materials, resilient, flexible masses or aggregates of a combination of the polymerized mixture and matter are produced having exceptionally high strength, impregnability to water and water-insolubility.

Recently, much technological emphasis has been placed upon treating sub-divided matter with various chemicals whereby the matter is bound into cohesive masses having improved resistance to external pressures of all types, whether exerted by human mechanical means or the forces of nature. This method of treating sub-divided matter, generically and loosely described as grouting, generally consists of contacting the matter with various organic monomers which are capable of polymerizing in the presence of such matter, and then allowing such polymerization to occur in the presence of the matter to bind the entire mass of matter and organic polymer into inter-mix masses of increased strength and resistance to external forces, particularly to water forces. For example, soil, commonly in a crumbled state of sub-division and susceptible to being swept away by water of any significant force, is first intimately contacted with polymerizable solutions. The mixture of soil and monomer after a certain period of standing is bound together by the polymerization reaction that occurs in situ. The effect of such treatment is to bind the soil into rubber-like masses or solidify it to a state whereby it is sufficiently cohesive to possess desirable qualities of impermeability and ability to bear high pressure loads, is rendered less pregnable to liquids such as water and is less susceptible to erosion by water and other natural forces.

A host of materials other than soil, whether naturally occurring or synthetic, if in the state of minute subdivision, may be likewise treated with polymerizing chemicals to produce coherent and cohesive masses of particulate matter intertwined with the now polymerized chemical. For example, finely divided sand, gravel, fluid muds, etc., may be suitably subjected to the chemical whereby desired states of cohesiveness and strength are produced. The sub-divided matter, as mentioned above, may be created synthetically, or may occur naturally either on the surface of the ground or in subterranean areas. Thus, soil existing on the surface may be suitably treated with the chemical grouting chemicals, or likewise, earth adjacent to passages beneath the surface of the earth may be desirably strengthened by such treatment. In the latter case, such passages are thereby stabilized against cave-ins or sliding.

The over-riding theme in all such cases of chemical treatment of particulate matter is to produce masses of sufficient strength to withstand continually applied man-made pressures or ever present forces of nature. While many prior art chemical treatments exemplified by the type in which certain organic monomers are polymerized in the presence of the particulate or subdivided matter have shown promise, certain deficiencies in such treatment are present, particularly in not fully meeting the desired standards and not having the extremely beneficial property of imparting exceptional high strength to the matter. Another drawback in such prior art chemical treatment is that while agglomerates of passable strength are initially produced, upon long-term application of forces and pressures such as continual flow of water, the agglomerated masses tend to thereby break down and disintegrate. Thus, the stabilized formations are only of relatively short-term duration. Likewise, in some instances the particulate matter may be formed into the desirable flexible cohesive masses, but gradually lose the moisture retained therein and have a tendency to crumble back into the undesired state of sub-division. Again, while some chemical treatments are useful in treating certain types of sub-divided matter, they are partially or sometimes wholly ineffective in treating matter of a different chemical-physical constituency. For example, some prior art treatments may be useful in binding together such materials as soil or other types of matter containing appreciable amounts of humus, but are relatively inefficient in forming agglomerates of matter containing large amounts of inorganic material such as siliceous formations typified by sand. At best, some prior art treatments only form inferior low-strength gels or agglomerates of certain particulate matter as soil and the like. These gels are generally unable to withstand the pressure flow and erosion of vast moving bodies of water. Particularly, beach sand has been found to be a particularly troublesome problem and difficult to gel to substantial strengths.

Untreated beach sand, subject to destructive waves is frequently swept away, causing shore erosion problems of great magnitude. Unless checked, waves of translation and oscillation which develop a great force, estimated to be between one to three tons per square foot of beach during storm conditions have a tendency to measurably decrease the depth of sand beaches. Prior art chemical materials have not been able to prevent to any substantial degree erosion by water of sandy beaches.

One of the best grouting treatments yet developed involves use of an acrylamide-based polymer which has been used in a number of formulated systems. However, this material is also deficient for a number of reasons. First the treatment is relatively costly and even prohibitively so for many applications. Also, particularly with respect to sand and other like materials, it has been noted that the acrylamide treatment does not sufficiently wet or coat the sand prior to setting up in the degree desired. Thus, much chemical is lost before gelation of the sand is completed. Particularly, the chemical treatment is frequently swept away by water flow before the setting process takes place and/or polymerization occurs mainly in the particulate voids bed without sufficient initial bonding of the particles. In many instances, properly controlled setting of the polymerizable mix is not possible.

Again, gel strength of the resultant acrylamide treated particulate matter is not sufficiently high to withstand pressure flow and erosion of water. It has been determined that even with benefit of acrylamide treatment, extremely high strength agglomerated masses cannot be realized from the thus treated particulate matter.

Particularly, this is true in such areas as prevention of severe shore erosion. Unless a beach is treated with suitable grouting material whereby exceptionally high strength sand gels are produced, the above problems are not solved to any substantial degree and beach depths cannot be maintained. Not only must the sand in beach areas be gelled to high strength such as by polymerization of various agents in the presence of such sand, but also the formed gels must not dry out and thereby disintegrate to their former sub-divided condition. Thus the formed gels must have exceptional strength concomitant with the property of water retention within the gel, whereby long-term gel formation and flexibility is sustained. As an alternative, the gel must at least maintain its hardened integral character even though water is slowly lost through the gel structure. A chemical treatment must be able to impart all the above desired characteristics to sand gels formed in the chemical's presence, and as well be relatively inexpensive so as to be practical.

It would, therefore, be a benefit to the art if a method were available for agglomerating or aggregating particulate matter into high strength cohesive masses such as sand gels able to withstand high pressure flow of various liquids, particularly water. Further advantages would accrue if such chemical treatment were available whereby the agglomerates or aggregates of particulate matter had the ability to remain flexible by means of retention of water, and thereby maintained the desired property of strength for long durations of time. If such particulate matter could be chemically treated whereby high strength property concomitant with excellent water retention, water-impregnability and water insolubility were attained, such a treatment would find ready aceptance in the art. Also if the above desirable properties were able to be achieved with respect to a host of sub-divided matter, inorganic and organic, synthetic and naturally occurring, without respect to varying characteristics of chemical and physical properties, such a chemical treatment would be a substantial step in the development of grouting techniques. Thus, if any single chemical treatment imparted such above desired properties to sub-divided particles, which qualities lasted over long periods of time, and could be achieved by simple, efficient and economical process means, this would be extremely useful. Lastly, if the method were widely adaptable to a variety of situations, and could be modified to suitable treatment of particulate matter such as surface and underground earth formations, it would be a substantial improvement of prior art methods which lack one or more of these desirable and sometimes essential attributes of applicability and/or efficiency.

Based on the above, it becomes an object of the invention to provide a process of aggregating particulate matter into masses characterized by exceptional strength and water-impregnability.

Another object of the invention is to provide highly cohesive and strongly bonded agglomerates of matter which had formerly existed in state of fine sub-division.

Yet another object of the invention is to provide a process of aggregating naturally occurring particulate matter by contact with novel polymerization mixtures added in either slurry, dry or aqueous solution states whereby the combination of particulate matter and polymerizable mixture after polymerization has been effected is converted to a unitary substantially water-impregnable mass of superior strength heretofore unattainable by prior art methods.

Still another object of the invention is to provide novel polymerization mixtures useful in carrying out the above process of aggregation.

A still further object of the invention is to provide a method of stabilizing soil compositions by treatment with a polymerizable mixture whereby the resultant composition has materially decreased permeability to inert aqueous liquids such as water, enhanced load-bearing qualities and substantially decreased susceptibility to erosion.

Another object of the invention is to provide a method of sealing porous earth formations adjoining earth channels artificially or naturally produced, by contact of said earth with novel polymerizable mixtures.

It is another object of the invention to provide a method of sealing strata in earth by injection therein of certain mixtures capable of polymerization in the presence of the earth, such process being particularly useful in drilling operations.

A special object of the invention is to provide a simple, inexpensive process of aggregating sands into gels of exceptionally high strength, water insolubility and water impregnability by contacting the sand with various mixtures capable of polymerization in its presence whereby the gel sand masses are capable of resisting the pressure flow of waters, in specific areas of gel formation and adjacent thereto.

Still another object of the invention is to provide sand gels having the above properties, which maintain these properties along with attributes of flexibility and mechanical integrity for long durations of time even when subjected to continual eroding stress of flowing water.

Other objects and advantages in the invention will be apparent to those skilled in the art upon further consideration of the invention discussed in detail hereinbelow.

In accordance with the invention, it has been discovered that particulate matter may be treated with certain polymerizable mixes whereby the matter is agglomerated or aggregated into cohesive masses having higher gel strengths than heretofore obtainable by prior art methods. In its most general aspects, the invention comprises the steps of contacting the particulate matter in the presence of water with a polymerizable mixture containing an unsaturated polyester, a colloidal silica sol, an alkali metal silicate, and a catalyst, and then effecting polymerization of the above mixture in the presence of particulate matter whereby the matter and mixture are converted to a substantially water impregnable mass, which mass possesses superior strength and is able to withstand moving forces such as water for a considerable duration of time and of relatively high magnitude of force. It is greatly preferred that the polymerizable mixture used to treat the particulate matter be in form of a water-in-oil emulsion.

The particulate matter which may be treated may be selected from a wide variety of inorganic and organic substances, synthetic and naturally occurring. By the term "particulate matter" is meant any substance in a sub-divided state or existing as fine particles. Among the type of materials which may be solidified into large cohesive masses are soil, clays, heavy fluid muds, sands, crushed granite, cement, silts, loams, peat, organic matter and inorganic matter in a particulate state such as humus, siliceous compounds, etc. For example, when soils are treated, whether they be topsoil or subterranean formations, the agglomerates formed by polymerization of the above-defined polymerizable mix in the presence of the soil helps to improve aeration, moisture retention, tilth, porosity, water absorption, etc. Particularly, the soil so treated has a substantially reduced tendency to erode when acted upon by flowing bodies of water, wind and other destructive forces of nature. The thus stabilized soil has sufficient strength and cohesiveness when the polymerization mixture is reacted in its presence so that a continuous rubber-like mat is formed composed of polymerized matter and soil. The flexible mat has measurably increased load-bearing qualities and is suitable for use in building highways, airplane runways, earth dams, specialized military purposes, etc. Other benefits imparted to the soil include better crop yield, decreased surface evaporation and better fertilizer utilization. Thus, it is seen that the invention is especially useful in treating soil which is used for highway and railroad road beds or other types of topological structures used to support heavy vehicles.

When the soil is solidified or cohered into large agglomerates or aggregates, it is rendered far less pregnable to liquids and becomes substantially water-insoluble or impervious to dispersion by water flow even when such flow has developed exceedingly high pressures. Thus, soil so treated when used as dams or levees prevents percolation of water therein. Likewise, leakage of water into tunnels or into oil wells through porous earth strata is substantially inhibited. Treatment of soil adjacent to foundations of homes thereby prevents entrance of water into home basements or cellars. The invention also finds use in excavating and trenching operations whereby the treated soil or other earth formations adjacent to such openings have improved strength and lower pregnability to water. Thus the soil surrounding such subterranean foundations is stabilized or anchored into place by the agglomerating process. This sealing effect has a strong tendency to prevent cave-ins or sliding and the soil formation maintains its desired integral character.

The invention is likewise useful in drilling operations. For example, drilling muds may be treated with the polymerizable mixture and have their viscosity therefore increased due to the agglomerating action of the mix. Thus, the muds are prevented from being lost through porous earth strata. Likewise, in drilling operations when casings or liners are placed in the channel well, these may be cemented in place by treating the soil just adjacent to these casings or liners. The compacted or densified earth formation adjacent to the casing then, in effect, helps to fix the liners or casings in place.

Likewise, earth or soil formations which are used as linings for reservoirs, irrigation ditches, etc., may be treated with the polymerizable mixture of the invention whereby they have increased resistance to the moving bodies of liquid constantly in pressure against the soil. The soil is thereby made flexible and rubbery and has increased shear strength and little or no tendency to form a sol, emulsion or a suspension in water, thereby resisting its flow. The invention is also suited to grouting mine shafts or other excavations. An important feature of this invention is connected with grouting of seawalls to prevent suction of the fill behind the wall and thus to prevent the wall from collapsing. Grouting behind the wall stops the fill from being washed at the bottom and prevents collapse of the ground held by the wall.

In the broadest aspects of the inventive method the polymerizable mixture or emulsion may be either directly applied as a liquid or mixed with the particulate matter such as soil and thereafter polymerized in situ in the presence of water which either normally exists in the particulate matter or is added thereto. It is evident that the particulate matter somehow enters into the structure of the polymerizable mixture or vice versa and is not merely an inert filler. Only through such inclusion of the particulate matter itself in the polymerization reaction could a solid coherent mass be produced having highly strengthened properties. Most probably, the polymerizing mixture at the time of reaction penetrates into the pores and voids of the particulate matter structure and thereafter the combination so formed, sets in a 3-dimensional structure having the desired rubber-like properties and high strength. Due to the fact that the chemical treatment has a greater tendency to coat particles than heretofore was possible in prior art processes, the above phenomenon is promoted to a higher degree.

As broadly mentioned above, the polymerizable mixture includes an unsaturated polyester as one of the ingredients. This well-known class of chemicals are polycondensation products of dicarboxylic acids with dihydroxy alcohols wherein at least one of the reactants contains a non-aromatic unsaturation. Usually the unsaturation is in the dicarboxylic acid reactant as exemplified by maleic and fumaric acids. It can also be introduced by the use of unsaturated alcohols. Thus, by activating the double bonds in the unsaturated polyesters, the unsaturated residues in the polycondensate polymerize by addition polymerization. Also, a certain amount of reaction between double bonds results in formation of a cross-linked structure. Similarly, the unsaturated polyesters may contain an additional unsaturated monomer such as styrene which cross-links the double bonds present in the unsaturated polyester. The catalyst employed, of course, promotes the above.

The most important unsaturated acids used in forming the polyesters of the invention are maleic and fumaric acids. The form of maleic most widely used is the anhydride. Other unsaturated dibasic acids such as endomethylene tetrahydrophthalic acid and derivatives thereof may also be condensed with alcohols. Again, if the alcohol reactant is unsaturated, one may employ a saturated polybasic acid such as phthalic acid or its anhydride, adipic, malonic, succinic, glutaric, pimelic, sorbic, trimellitic and similar acids.

Generally, alcohols used in polyester manufacture are dihydroxy alcohols or glycols. Thus, saturated glycols such as ethylene, propylene, diethylene, and dipropylene glycols may be used. Other alcohols usable in preparing unsaturated polyesters are unsaturated alcohols as allyl alcohol and unsaturated glycols such as 2,5-dimethyl 3-hexyne-2,5-diol, etc.

Cross-linking agents which aid in curing the polyester in presence of catalyst include such materials as styrene, diallyl phthalate, methyl methacrylate and the like.

The next component used to form the polymerizable mix of the invention is an alkali metal silicate. These are well-known materials and need little elaboration. A preferred alkali metal silicate is sodium silicate. A typical commercial sodium silicate contains from 35–40% sodium silicate in aqueous solution.

Another component used in the invention is a colloidal silica sol. This component aids in forming the preferred form of treatment, a reverse emulsion or water-in-oil emulsion, that is, an emulsion of water in liquid polyester. Formation and use of an emulsion is particularly helpful since such emulsion easily and preferentially wets the treated particles such as sand, leading to enhanced results. The silica sol also controls the induction period of polymerization, allowing greater utility in application. Like the alkali metal silicate, the silica sol also helps to maintain the emulsion state.

These are well-known materials and are commercially available from several sources of supply. A typical group of commercially available silica sols that may be used in the practices of the invention are those silica sols sold under the name "Nalcoag." Silica sols of this type are described below in Table I.

TABLE I

| Silica Sol | I | II | III | IV | V | VI |
|---|---|---|---|---|---|---|
| Percent colloidal silica as $SiO_2$ | 15 | 30 | 35–36 | 21–22 | 49–50 | 35 |
| pH | 8.6 | 10.2 | 8.6 | 3.7 | 9.0 | 3.5 |
| Viscosity at 77° F. cps | <5 | <5 | <10 | <10 | 20–30 | 6.5 |
| Specific gravity at 68° F | 1.09 | 1.205 | 1.255 | 1.06 | 1.385 | 1.255 |
| Average surface area, $M.^2$ per gram of $SiO_2$ | 330–430 | 190–270 | 135–190 | 135–190 | 120–150 | 135–190 |
| Average particle size, millimicrons | 7.9 | 11–16 | 16–22 | 16–22 | 20–25 | 16–22 |
| Density, lbs./gallon at 68° F | 9.1 | 10.0 | 10.5 | 8.8 | 11.6 | 10.5 |
| $Na_2O$ percent | 0.04 | 0.40 | 0.10 | 0.05 | 0.30 | 0.01 |

Other silica sols that may be used in addition to those above, may be prepared by using several well-known conventional techniques. Perhaps the most convenient method of making aqueous colloidal silica sols is described in Bird, U.S. Patent 2,224,355, wherein a dilute solution of an alkali metal silicate is passed in contact with a cation exchange resin in hydrogen form, whereby the silicate is converted to a dilute aqueous silicic acid sol. The dilute silicic acid sol may be both converted to a silica sol and concentrated to solids concentrations which are more economically usable from the standpoint of shipping costs and ultimate process use, by employing the techniques described in either Bechtold et al., U.S. Patent 2,574,902; Bragg et al., U.S. Patent 2,680,721; or Alexander et al., U.S. Patent 2,601,235. Another type of silica sol which may be used in the practices of the invention is described in the specification of Reuter, U.S. Patent 2,929,790. While aqueous colloidal silica sols may be used, it will be understood that other forms of colloidal silica may be employed, such as for instance, sols which contain a major portion of polar organic solvents. Said sols may be generically referred to as organo sols, and are typified by the sols described in Marshall U.S. Patent 2,386,247. It is only necessary that the silica particles used can be dispersed colloidally in a hydrophilic substance, such as water or lower alkyl alcohols and other organic compounds possessing relatively high dielectric constants.

Regardless of the method employed to produce the colloidal silica sol containing water, polar organic liquids or mixtures of these substances as a continuous suspending phase, it is desirable that said sols contain silica particles which are dense, amorphous, and have an average particle diameter which does not exceed 150 millimicrons and is greater than 5 millimicrons. As evidenced by a reading of Table I, all the silica sols contemplated as starting materials have an average particle size diameter well below 150 millimicrons. Preferably, the starting silica sols have an average particle size diameter of from 10–50 millimicrons. The silica concentration in the sols may be between 10% and 60% by weight silica expressed as $SiO_2$. More preferred sols contain from 20% to 60% by weight of silica and most preferably 25–50% by weight. The molecular weight of the silica particles is in excess of 200,000 and may range as high as several million.

Another necessary ingredient in the polymerizable mixture is a catalyst. Both a single catalyst such as a water-soluble oxygen-containing catalyst, e.g., ammonium, potassium and sodium persulfates, hydrogen peroxide, the alkali metal and ammonium perchlorates, etc., may be used as well as the known 2-component redox catalyst system. In the latter system, water-soluble peroxy catalysts such as persulfuric, perboric, perchloric, and permanganic acids, as well as their salts may be suitably employed as the oxidizing component. Particularly, ammonium potassium, and sodium persulfates, hydrogen peroxide and the alkali metal and ammonium perchlorates may be used as oxidizing reagents. As the reducing component silver nitrate, triethanol amine, nitrilotrispropionamide, sodium thiosulfate, sodium or potassium bisulfite, thiosulfate or metabisulfite may be used. Preferred is the two-component system containing a reducing agent and an oxidizing agent and more preferably the water-soluble persulfate salts. Most preferably, ammonium and alkali metal persulfates are employed.

The mode of addition of the various components of the polymerizable mix to the particulate matter may be widely varied without departing from the scope of the invention, although as will be discussed later, some addition techniques give enhanced results. For example, all the constituents of the mix may be intermixed and the entire mixture added to the particulate matter in one step. Also one or more of the various components may be mixed, and these premixes then added to the matter which is desired to be aggregated. All are essential, however, in forming the appropriate cohesive masses of matter with their resultant desired property of high agglomerate strength. It has been determined that use of all four ingredients are necessary to yield high strength gels of treated particulate matter. Omission of one or more of the ingredients results in situations of poor strength, premature setting, a setting time of too long a duration and other undesirable phenomenon.

In one preferred embodiment, the polyester is added to a water solution containing the reducing component of the catalyst system. The silica sol, sodium silicate and catalyst are then added to the aqueous solution in that order to form a polymerizable emulsion useful in practice of the invention.

Particulate matter such as soil, sand, gravel, etc., after contact with the polymerizable mixtures of the invention, form a treated composition in which the ratio of polymerizable mixture to particulate matter preferably ranges from 0.5:100 to 50:100 and most preferably ranges from 5:100 to 40:100.

As mentioned above, the polymerization mixes may be added to almost any type of particle in a sub-divided state to agglomerate these into large masses, and in many cases, depending upon the application, into a single unitary cohesive mass or gel. By far, the most preferred application is that of treatment of sand. It has been determined that prior art treatments were either unable to gel the sand to any substantial degree, or the gels so formed were of inferior strength so as to be virtually useless. The problem of beach erosion is a particularly serious one and heretofore exceedingly difficult to combat. Damages due to such erosions run into multimillion dollar figures due to loss of beach and property damage. Because of such destructive erosion, shorelines may recede as much as from 30–100 feet per year. Unless the sand is gelled into masses of strength sufficient to meet the ever present movement of waters caused by various waves, currents, tides, and man-made obstructions such as sea-walls, groins and inlets, such destructive unchecked erosion will continue to destroy much valuable property. When practicing the invention by contacting the sand in any one of the number of specific process embodiments which will be more fully discussed hereinafter, it has been determined that the destructive erosive force of the waves may be resisted. Also, sand, when gelled to the necessary high strength through the method of the invention, thereby resisting dislodgement by the force of waves has been found to be of long-term gel strength. Likewise, the sand gels have excellent impermeability to water and retain their flexibility and rubber-like properties due to excellent retention of water over long periods of time. The gels so formed have little tendency to dry out and thereby crumble into smaller particles which are susceptible to destructive wave forces. Moreover, the invention finds use with many types and varieties of sand, whether semi-coarse, coarse, or fine. Also, since the sand itself contains a considerable amount of water, on an average of about 20% by weight, the polymerization mixture may be added to such particulate sand matter in a dry mix and further water need not be added. The invention finds particular use in treatment of sand containing inorganic salts as sodium chloride as well as organic matter. Many prior art processes fail in their treatment of such composite sands.

Untreated shoreline sand may contain as much as 25% void spaces, depending on particle size, type, and amount of inorganic impurities, moisture content, type and content of calcareous skeletons of marine organisms and chitin, etc. When saturated with water, these void spaces no longer exist and static friction is thereby overcome to the point where each sand particle slips readily. Thus, under the influence of translating waves and high tides, these particles move freely. By filling up the void spaces with cross-linked polymer material, there is caused increased cohesion and adhesion of the sand particles and movement of the entire body of sand is thereby prevented.

The specific methods of applying the polymerizable mixtures of the invention may be widely varied in their scope. For example, the polymerizable mix, either in solid or solution form, may be spread over the surface of the particulate matter such as soil and then raked into intimate contact as by rakes or disc or rotary cultivators. One or more of the polymerizable ingredients going to make up the total mixture may likewise be premixed with a portion of the particulate matter such as soil and the other ingredients then added thereto. In still another embodiment, the particulate matter such as soil may be sprayed with solutions of the various components comprising the polymerization mixture in one or more applications. The soil may be plowed up either before or after the spraying operation in order to obtain the necessary intimate contact.

In yet another modification of the process of the invention, pipes or other hollow cylinders containing perforate injection nozzles may be inserted into the particulate substrate to be treated, such as the sub-surface of the ground in spaced intervals, and the polymerizable solutions injected through the nozzles under pressure. An excellent method of application involves digging of a continuous trench in the area to be treated, placing the components of the polymerization mixture in one or more applications and then filling up the trench with additional particulate matter. In such a method, a strong continuous barrier is produced which has excellent stability against elements such as moving bodies of water. Another means of applying the mixture of polymerization components involves removing the particulate matter such as soil from the area where found and intermixing it with the polymerizable components by means of such apparatus as revolving drums and the like. The composite is then laid down where desired. Yet another means of applying the mixture of polymerizable components is by using plastic or fabric containers, or other types of collapsible holders. These containers are filled with particulate matter as sand which is then saturated with the polymerizable components, or they are filled with a dry mix of sand and polymerizable ingredients and allowed to become wetted and thereby polymerize at the place of treatment. This type application is very useful in areas where the shore line has eroded to a degree that no sand is available for treatment by other described methods. This application serves to build temporary groins and jetties so that sand can be collected with incoming storms. Another advantage of this method is in the prevention of leeward groin erosion caused by shifting winds.

One of the best ways to apply the treatment of the invention is to build up a plurality of sand mounds or a single continuous mound with a trench or trenches in front. Preferably, the trenches are in form of a contour arc with ends extending toward the onrushing water. The mounded sand is then treated with the polymerizable mix by flowing of the emulsion over the mounds whereby a series of "aprons" are formed after the polymerization process has taken place. The cascading effect of the waves deposits sand both in front and in back of the raised sand portions. Thus, additional sand adjacent to the gelled sand is utilized to build up a protective barrier.

In all of the above-discussed applications, the procedure found most efficient is to mix polyester, colloidal silica sol and alkali metal silicate with water to form an emulsion, and add to this a catalyst just prior to contacting the particulate matter. This obviates the possibility of the polymerizable emulsion prematurely gelling prior to contact with sand or other similar types of material. Generally, the aqueous polymerizable emulsified mixture contains at least 20% by weight of water and most often at least 50% by weight. Most preferably, the emulsion contains 50-90% water and 10-50% of polyester, silica sol, alkali metal silicate and catalyst.

It has been determined that the most preferred polymerizable mixes comprise 25-75% by weight of polyester, 20-50% by weight of silica sol, 6.0-25.0% by weight of alkali metal silicate and 0.2-8% by weight of catalyst, each percentage based on total of these four ingredients. For best results, the mix generally contains 40-60% by weight of esters, 30-45% by weight of sol, 10-20% by weight of silicate and 0.5-3% by weight of catalyst.

To illustrate the efficacy of the invention, the following tests were run on an actual sand beach. To 300 pounds of water was added 1.5 pounds of triethanolamine, 60 pounds of an unsaturated polyester derived from isophthalic acid, 45 pounds of a silica sol containing 30% by weight of colloidally suspended silica particles, 15 pounds of a 37% aqueous solution of sodium silicate and 1.5 pounds of ammonium persulfate. A relatively stable emulsion was formed. The redox catalyst components were added to the remainder of the materials just before the sand was contacted. Two systems of treatment were involved. In one, the above polymerizable emulsion was injected into the sand, and the other mounds of sand were built up as described above and the treatment cascaded over these mounds. In each instance, tough gels were produced in an extremely short induction time of approximately 20-30 seconds. It was noted that the gelled sand barrier in each instance maintained its structure during this time and its integral character was not in any way eroded by the rushing water waves. In addition to imparting excellent gel strength to the treated sand, the gelled sand remained in a cohesive state upon long-term standing and had little tendency to lose the water trapped therein. The gels maintained their integral character, and remained in the desired flexible and resilient state over long periods of time. Particularly the gels or cohesive masses of sand and polymerized mixes of the invention showed no tendency whatsoever to fragment or crumble to smaller units even when some previously retained moisture had been lost.

The invention is hereby claimed as follows:

1. A process of aggregating particulate matter to produce exceptionally high strength agglomerates thereof which comprises the steps of contacting said matter in the presence of water with a polymerizable mixture comprising 25-75% by weight of an unsaturated polyester, 20-50% by weight of a colloidal silica sol containing 10-60% by weight of substantially discrete, dense non-agglomerated particles of silica colloidally dispersed in an aqueous liquid, 6-25% by weight of an alkali metal silicate, and 0.2-8% by weight of a catalyst, and effecting polymerization of said mixture in the presence of said particulate matter whereby said matter and said mixture are converted to a substantially water-impermeable mass, characterized as possessing superior strength.

2. The process of claim 1 wherein said mixture comprises 40-60% by weight of said polyester, 30-45% by weight of said silica sol, 10-20% by weight of said alkali metal silicate and 0.5-3% by weight of said catalyst.

3. The process of claim 1 wherein the ratio of said mixture added to said particulate matter ranges from 0.5:100 to 50:100.

4. The process of claim 1 wherein said particulate matter is sand.

5. The process of claim 1 wherein said alkali metal silicate is sodium silicate.

6. A process of aggregating and stabilizing soil which comprises the steps of injecting beneath the surface of such soil in the presence of water a polymerizable mixture comprising 25-75% by weight of an unsaturated polyester, 20-50% by weight of a colloidal silica sol containing 10-60% by weight of substantially discrete, dense non-agglomerated particles of silica colloidally dispersed in an aqueous liquid, 6-25% by weight of an alkali metal silicate, and 0.2-8% by weight of a catalyst, and effecting the polymerization of said mixture in the presence of such soil whereby said soil and said mixture are converted to a substantially water-impermeable mass, further characterized as possessing superior strength.

7. A process of sealing a porous earth formation adjoining a channel in the earth which comprises injecting into the porous formation in the presence of water a polymerizable mixture comprising 25-75% by weight of an unsaturated polyester, 20-50% by weight of a colloidal silica sol containing 10-60% by weight of substantially discrete, dense non-agglomerated particles of silica colloidally dispersed in an aqueous liquid, 6-25% by weight of an alkali metal silicate, and 0.2-8% by weight of a catalyst, and effecting polymerization of said mixture in the presence of said porous earth formation whereby said earth formation and said mixture are converted to a substantially water-impermeable mass, further characterized as possessing superior strength.

8. In a process of drilling into earth formations which comprises the steps of sealing a strata in the earth by injecting into said earth in the presence of water a polymerizable mixture comprising 25-75% by weight of an unsaturated polyester, 20-50% by weight of a colloidal silica sol containing 10-60% by weight of substantially discrete, dense non-agglomerated particles of silica colloidally dispersed in an aqueous liquid, 6-25% by weight of an alkali metal silicate, and 0.2-8% by weight of a catalyst, and effecting polymerization of said mixture in the presence of said earth whereby said earth and said mixture are converted to a substantially water-impermeable mass, further characterized as possessing superior strength.

9. A process of aggregating sand to gels of exceptional high strength which comprises the steps of contacting said sand in the presence of water with a polymerizable mixture comprising 25-75% by weight of an unsaturated polyester, 20-50% by weight of a colloidal silica sol containing 10-60% by weight of substantially discrete, dense non-agglomerated particles of silica colloidally dispersed in an aqueous liquid, 6-25% by weight of an alkali metal silicate, and 0.2-8% by weight of a catalyst, and effecting polymerization of said mixture in the presence of said sand whereby said sand and said mixture are converted to a substantially water-impermeable and water-insoluble gel state of superior strength.

10. The process of claim 9 wherein the ratio of said polymerizable mixture to said sand ranges from 0.5:100 to 50:100.

11. As a composition of matter, a polymerizable mixture which comprises 25-75% by weight of an unsaturated polyester, 20-50% by weight of a colloidal silica sol containing 10-60% by weight of substantially discrete, dense non-agglomerated particles of silica colloidally dispersed in an aqueous liquid, 6-25% by weight of an alkali metal silicate, and 0.2-8% by weight of a catalyst.

12. A composition of matter which comprises particulate matter and a polymerizable mixture comprising 25-75% by weight of an unsaturated polyester, 20-50% by weight of a colloidal silica sol containing 10-60% by weight of substantially discrete, dense non-agglomerated particles of silica colloidally dispersed in an aqueous liquid, 6-25% by weight of an alkali metal silicate, and 0.2-8% by weight of a catalyst, said composition of matter capable of being converted into agglomerated masses of exceptionally high strength by polymerization of said mixture in the presence of said particulate matter and water.

13. The composition of claim 12 wherein the ratio of said polymerizable mixture to said particulate matter ranges from 0.5:100 to 50:100.

14. The composition of claim 12 wherein said particulate matter is sand.

15. A process of aggregating sand to gels of exceptional strength which comprises the steps of contacting said sand with a polymerizable water-in-oil emulsion comprising in addition to said water 25-75% by weight of an unsaturated polyester, 20-50% by weight of a colloidal silica sol containing 10-60% by weight of substantially discrete, dense, non-agglomerated particles of silica colloidally dispersed, 6-25% by weight of an alkali metal silicate and 0.2-8% by weight of a catalyst, said weight percentages based on total weight of said polyester, silica sol, alkali metal silicate and catalyst, and effecting polymerization of said emulsion in the presence of said sand whereby said sand and said emulsion are converted to a substantially water-impermeable and water-insoluble gel state of superior strength.

References Cited

UNITED STATES PATENTS

| | | | |
|---|---|---|---|
| 2,447,725 | 8/1948 | Adams et al. | 106—84 |
| 2,462,618 | 2/1949 | Eilerman | 260—29.2 X |
| 2,473,801 | 6/1949 | Kropa | 260—29.2 X |
| 2,597,872 | 5/1952 | Iler | 252—313 X |
| 2,701,218 | 2/1955 | Nickerson | 260—29.2 X |
| 2,833,661 | 5/1958 | Iler | 106—84 X |
| 2,865,177 | 12/1958 | Gnaedinger | 61—36 |
| 3,087,544 | 4/1963 | Forsman | 166—33 |
| 3,152,641 | 10/1964 | Boyd | 166—33 |
| 3,202,214 | 8/1965 | McLaughlin | 166—30 |

STEPHEN J. NOVOSAD, *Primary Examiner.*

UNITED STATES PATENT OFFICE
CERTIFICATE OF CORRECTION

Patent No. 3,371,712                                          March 5, 1968

Nicholas M. Adams

It is certified that error appears in the above identified patent and that said Letters Patent are hereby corrected as shown below:

Columns 5 and 6, TABLE I, fourth column, line 3 thereof, "10" should read -- 5 --.

Signed and sealed this 25th day of November 1969.

(SEAL)
Attest:

Edward M. Fletcher, Jr.                            WILLIAM E. SCHUYLER, JR.
Attesting Officer                                             Commissioner of Patents